US006397076B1

(12) United States Patent
Brown et al.

(10) Patent No.: US 6,397,076 B1
(45) Date of Patent: May 28, 2002

(54) METHOD AND APPARATUS FOR DISPATCH COMMUNICATIONS IN A BROADCAST RADIO SYSTEM

(75) Inventors: David L. Brown, Lake Worth; Craig Wadin, Sunrise, both of FL (US)

(73) Assignee: XM Satellite Radio, Inc., Washington, DC (US)

( * ) Notice: Subject to any disclaimer, the term of this patent is extended or adjusted under 35 U.S.C. 154(b) by 0 days.

(21) Appl. No.: 09/434,734

(22) Filed: Nov. 5, 1999

(51) Int. Cl.[7] .................................................. H04B 7/00

(52) U.S. Cl. ....................... 455/521; 455/426; 455/419; 455/45; 455/185.1; 455/186.1; 455/404

(58) Field of Search ............................... 455/45, 185.1, 455/186.1, 404, 521, 426, 522, 518, 519, 305

(56) References Cited

U.S. PATENT DOCUMENTS 5,708,662 A * 1/1998 Takashima .................. 370/496
5,812,937 A * 9/1998 Takahisa et al. .............. 455/66

* cited by examiner

*Primary Examiner*—William Trost
*Assistant Examiner*—Danh Le
(74) *Attorney, Agent, or Firm*—William J. Benman, Esq.

(57) ABSTRACT

A method and apparatus for receiving dispatch messages in a broadcast radio receiver. In one embodiment, audio dispatch messages can be received, in another embodiment, data dispatch messages can be received. In either embodiment, a previously selected broadcast channel is received until a dispatch alert message is simultaneously received. The dispatch alert message includes a dispatch ID codes which is compared by the receiver with a previously stored dispatch ID code. If equality is found, the receiver switches from the previously selected broadcast channel to a dispatch broadcast channel to receive the dispatch message. Upon completion of the dispatch message, the receiver automatically switches back to the previously selected broadcast channel.

15 Claims, 3 Drawing Sheets

METHOD AND APPARATUS FOR DISPATCH COMMUNICATIONS IN A BROADCAST RADIO SYSTEM

BACKGROUND OF THE INVENTION

1. Field of the Invention

The present invention relates to dispatch radio communications. More specifically, the present invention relates to dispatch communications in broadcast radio receivers adapted to receive dispatch messages during the reception of conventional program signals in a broadcast radio system.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Satellite radio operators will soon provide digital quality radio broadcast services covering the entire continental United States. These services intend to offer approximately 100 channels, of which nearly 50 channels will provide music with the remaining stations offering news, sports, talk and data channels. According to C. E. Unterberg, Towbin, satellite radio has the capability to revolutionize the radio industry, in the same manner that cable and satellite television revolutionized the television industry.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHz) of the electromagnetic spectrum for satellite digital broadcasting, 12.5 MHz of which are owned by CD Radio and 12.5 MHz of which are owned by the assignee of the present application "XM Satellite Radio Inc." The system plan for each licensee presently includes transmission of substantially the same program content from two or more geosynchronous satellites to both mobile and fixed receivers on the ground. In urban canyons and other high population density areas with limited line-of-sight satellite coverage, terrestrial repeaters will simultaneously broadcast the same program content in order to improve coverage reliability.

In accordance with the XM frequency plan, each of two geosynchronous Hughes 702 satellites will transmit identical or at least similar program content. The signals will be transmitted with QPSK digital modulation. The assigned 12.5 MHz bandwidth is called the "XM" band. The modulation scheme allows up to 4096 Mbits/s of total user data to be distributed across the available bandwidth. The data transmission will be multiplexed according to a TDM interleaving scheme, multiplexing that various channels of program content together, which provides for the simultaneous transmission and simultaneous reception of the various channels. Receivers will receive and de-interleave, or demultiplex, the channels for reception of the desired program content by end users.

The new XM band broadcast system will deliver a large volume of digital quality audio, including music and other program content to end users. While broadcasts which closely mimic convention commercial analog broadcast will be provided, the inherent capability to simultaneously broadcast and simultaneously receive the various channels makes it possible to provide advanced program content and messaging capabilities will be possible. It is anticipated that end users may desire special services that meet their particular needs. For example, in a fleet environment, where multiple end users are related in a personal or business nature, specialty messaging, otherwise known as dispatch messages, may be desired so that a particular fleet of users can be advised with information conforming to their needs. In a similar vein, individual users may desire to receive specialty, or dispatch messages, directed to them personally. However, since users in a fleet environment, or individual users, may be monitoring conventional broadcast program content, they may not be 'tuned' to an alternate channel comprising the specialty information.

Thus there is a need in the art for a method and device to deliver dispatch messages which are transmitted, received, and recognized notwithstanding the fact that the users are monitoring program content broadcast to a general audience.

SUMMARY OF THE INVENTION

The need in the art is addressed by the apparatus and methods of the present invention. The inventive method operates in a satellite digital radio broadcast system in which dispatch radio signals are provided to a receiver in the system which transmits dispatch alert messages on broadcast information channels, transmits dispatch messages on dispatch broadcast channels, and transmits program content on broadcast channels. The receiver simultaneously monitors a broadcast information channel TDM slot to receive dispatch alert messages while receiving program content on a broadcast channel TDM slot. When a dispatch alert message is sent, and upon receiving the dispatch alert message on the broadcast information channel, which identifies a dispatch broadcast channel and a dispatch message ID code, the radio compares the dispatch message ID code to another previously stored dispatch ID code in the receiver. If the two are found to be equal, the receiver recognizes the message as being addressed to that particular receiver and demultiplexes a dispatch message identified by the dispatch ID code on the dispatch broadcast channel. The receiver then provides the dispatch message to an audio output circuit, if it is an audio message, and upon completion of the dispatch message, subsequently reverts to receiving the broadcast channel. On the other hand, if the dispatch message is a data message, the receiver stores the message in a memory and utilizes it in another appropriate fashion, such as displaying it on a display or delivering it to another computing device or function. In this fashion, the user can monitor program content on a convention broadcast channel, yet still receive dispatch message as they occur, then revert to the previously selected program content.

In the illustrative embodiment, each radio in the system has a unique dispatch ID code previously stored within a memory which allows dispatch messages to be uniquely addressed to that particular radio. All radios compatible with the system also have a common dispatch ID code previously stored within the memory. In this way, dispatch messages may be sent to all radios simultaneously. This is useful for emergency situations and situations where the system operator, or others, desire to address a dispatch message to all users within a system.

In the situation where a fleet of receivers share a common interest, such as in a business environment, the system and receivers are adapted to be organized so that all members of the fleet receive the same dispatch message, but no other users in the system receive it. The system broadcasts ID code assignment messages on the broadcast information channels, and the ID code assignment messages include assigned dispatch ID codes related to unique dispatch ID codes of the receivers in the targeted fleet or other grouping of receivers. The receivers receive an ID code assignment message on the broadcast information channel. The ID code assignment message has within it an assigned dispatch ID code and a unique dispatch ID code. The receiver compares the unique dispatch ID code in the message to the unique previously stored dispatch ID code in the receiver. If they are found to be equal, the receiver stores the assigned dispatch ID code in its memory so that subsequently received dispatch message can be compared with the, now stored, assigned dispatch ID code. This allows the receiver to receive messages addressed to the assigned dispatch ID code as well as the unique dispatch ID code and the common dispatch ID code. In the case of a fleet, each of the receivers in the fleet are programmed with the same assigned dispatch ID code so that each is enabled to receive messages common to that fleet.

Each dispatch message in the preferred embodiment also includes a termination field. This field of data notifies the receiver that the dispatch message has been completely received and causes the receiver to revert to the previously selected broadcast channel program content. Of course, the dispatch broadcast channel is used from time to time by various users in the system. Therefore, on completion of a message, a subsequent message to another user is likely to follow. It is possible that a receiver may not receive an entire dispatch message. This creates a potential problem in that the termination field may not be received and the receiver will continue to receive the next subsequent dispatch message that is intended for another user. To alleviate this problem, the receiver is adapted to terminate the reception of the dispatch message on the occurrence of some other event. A time-out timer may be employed to end the reception of dispatch messages or the receiver may monitor the message for other dispatch ID codes that are not present in the receiver's memory thereby causing the termination of the reception of dispatch message. In an illustrative embodiment, the current dispatch ID code for the dispatch message being transmitted is encoded into the message periodically and is interpreted by the receiver as indicating that the current message is for that receiver. In the event that dispatch ID code ceases to be present in the message, the receiver terminates reception of that message and reverts to the previously selected broadcast channel. Other methods for such termination are obvious to those skilled in the art, including but not limited to, error detection, recognizable bit patterns, or stop bits. In any event, the recognition of the termination of a dispatch message causes the receiver to return to the previously selected broadcast channel.

The receiver in the preferred embodiment, which generally includes all of the circuits needed to accomplish the reception of broadcast and dispatch messages, includes a radio receiver, in the preferred embodiment, an XM radio receiver, adapted to receive broadcast and dispatch messages through an antenna in the previously described system.

The radio receiver outputs the multiplexed data signals including the broadcast information signals, broadcast signals, and dispatch broadcast signals. This output is coupled to a data demultiplexer that receives the multiplexed data signals. The demultiplexer has a first output for providing demultiplexed broadcast information channel signals and a second output for selectively outputting broadcast channel signals or dispatch channel signals, or simply dispatch messages, in accordance with control commands it receives. The second output is coupled to an output circuit which converts the broadcast channel signals or dispatch messages to analog audio signals for output to an audio transducer or to a memory in the case of data dispatch messages. It may also store the audio content in a memory for later recall by the user. The broadcast information signals output through the first output are coupled to an address correlator. The address correlator continuously compares the flow of data in the broadcast information signals to the previously stored dispatch ID codes stored in the receiver's memory.

In the event there is determined to be an equality between an ID code transmitted in a dispatch alert signal, that is transmitted in the broadcast information signals, and one of the previously stored dispatch ID codes, the address correlator activates a dispatch alert output which indicates the existence of the equality. A controller, coupled to the data demultiplexer, receives the dispatch alert signal and causes an audio channel demultiplexer to change states from demultiplexing the broadcast channel signals to demultiplexing the dispatch signals. On receipt of the termination field, or other events described above, the controller causes the audio channel demultiplexer to revert to demultiplexing the broadcast channel signals.

With respect to the transmission of dispatch messages, assignment of fleet ID codes and so forth at the uplink site, the insertion of such information differs little from the broadcast of any other information in the system. The data is gathered by a controller at the uplink site and is inserted onto the broadcast information channel or dispatch channel. The information may be fed to the controller by keying the data into a terminal or it may be communicated electronically locally or remotely through a data network. Those skilled in the art will realize various methods and devices can be used to assemble such data.

DESCRIPTION OF THE INVENTION

Illustrative embodiments and exemplary applications will now be described with reference to the accompanying drawings to disclose the advantageous teachings of the present invention.

Figure 1:
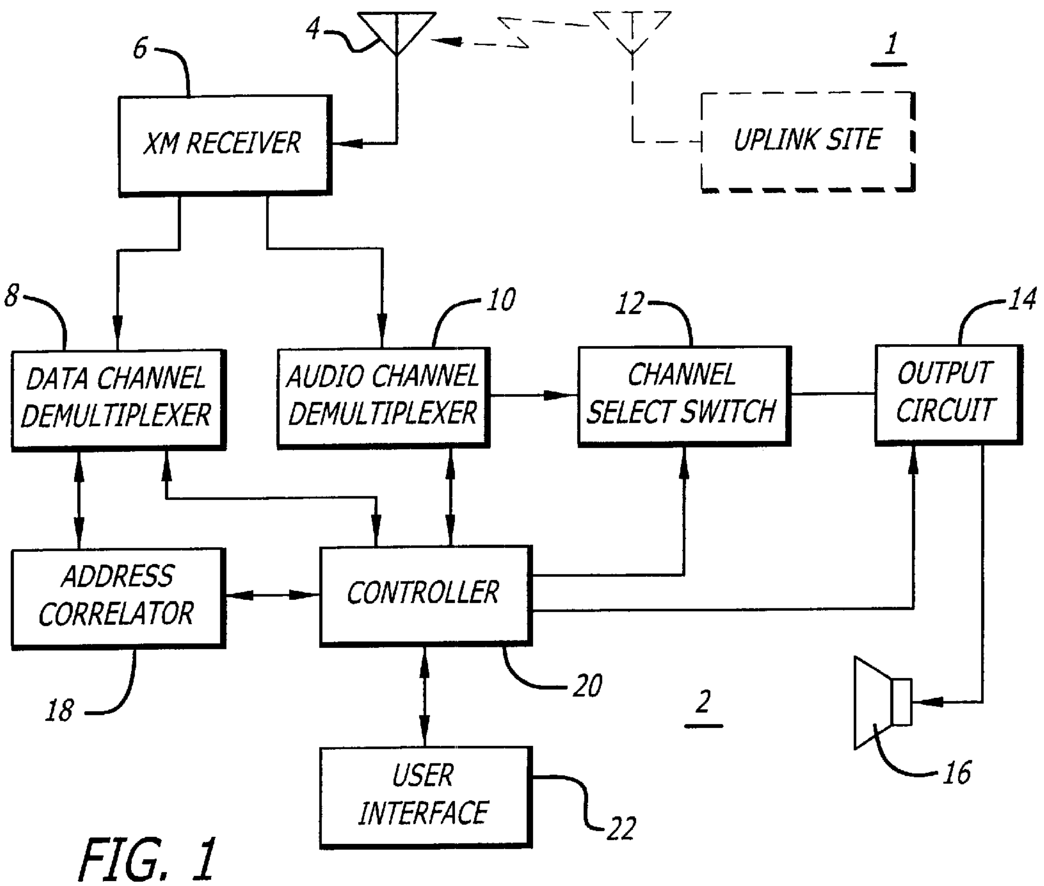
FIG. 1 is a block diagram of a preferred embodiment of the system of the present invention.

Reference is directed to FIG. 1 which is a block diagram of the preferred embodiment receiver 2. The XM radio uplink site 1, which includes satellite links and terrestrial repeaters (not shown), transmits radio signals which are intercepted by antenna 4 and coupled to radio receiver 6, also known as an XM radio receiver The uplink site and related equipment as well as the XM radio receiver are disclosed in detail in co-pending U.S. patent application Ser. No. 09/318,296, filed by Marko et al. on May 25, 1999 (Atty. Docket No. XM 0006) the teachings of which are incorporated herein by reference.

The radio receiver 6 demodulates the radio signals to a TDM multiplexed data signal that comprises dispatch alert messages on broadcast information channel TDM slots, dispatch messages on dispatch broadcast channel TDM slots, and program content on broadcast channel TDM slots. The TDM multiplexed data signals are coupled to data channel demultiplexer 8 and audio channel demultiplexer 10. The data channel demultiplexer 8 serves the function of demultiplexing the broadcast information channel and other data service channels that may be in operation in the system, in accordance with commands received by controller 20. The design and operation of TDM slot demultiplexer are well known to those skilled in the art.

In normal receive operation, the user activates a control within user interface 22 to select a broadcast channel to receive program content that is desired. The demultiplexed broadcast channel data signal is coupled from audio channel demultiplexer 10 to channel select switch 12. Channel select switch 12, under control of controller 20, decodes the selected broadcast channel and provides that channel's data signal to output circuit 14. Output circuit 14 converts the digitally encoded broadcast channel signal to an analog audio signal which drives audio transducer 16. The digital to analog conversion of the output circuit 14 is well known to those skilled in the art. The audio transducer 16 may be a stereo or monaural audio transducer such as a loudspeaker or headphone.

Simultaneous with the reception and playing of the audio broadcast channel, address correlator 18 monitors the output of data channel demultiplexer 8. In the preferred embodiment, controller 20 controls the data channel demultiplexer 8 to select and demultiplex a broadcast information channel The system transmits dispatch alert message on the broadcast information channel and within the dispatch alert messages are dispatch ID codes which identify the radio or radios that are targeted to receive an upcoming dispatch message. Address correlator 18 continuously monitors the data flow of the broadcast information channel and compares the bit pattern with previously stored dispatch ID codes, which are stored in a memory (not shown). The memory may be an external memory device or may be internal to controller 20.

In an illustrative embodiment, the address correlator 18 comprises a fixed register loaded with one or more previously stored dispatch ID codes and a serially load shifted register which is sequentially loaded with the broadcast information channel data flow in a first-in, first-put fashion. As each bit of data in loaded into the shift register, the register content is compared with the dispatch ID code. When they are found to be equal, a dispatch ID code on the broadcast information channel data flow has been found for the particular radio. When address correlator 18 finds equality between a dispatch ID code in the dispatch alert message and one of those previously stored in the memory, a signal is coupled to controller 20 indicating such equality.

The dispatch alert message may also comprise a designation of a dispatch broadcast channel and this information is coupled to controller 20 as well. Since the controller 20 has identified the presence of a dispatch message and the appropriate dispatch broadcast channel, the controller 20 directs the channel select switch 12 to decode the appropriate dispatch broadcast signal from audio channel demultiplexer 10. The signal is subsequently coupled through output circuit 14 to audio transducer 16 for listening by the user. In the case that the dispatch message is a data message, as indicated in the dispatch alert message, the controller directs data channel demultiplexer 8 to demultiplex the data dispatch message and couple it to controller 20. The data dispatch message is stored in the memory and may be presented to a display in user interface 22, or coupled to an external computing device through a communications port coupled to controller 20 (not shown). The implementation and utilization of such data messages are well known to those skilled in the art.

The dispatch message received, whether an audio message or a data message may contain an associated "dispatch ID" or may be terminated by a termination field in the preferred embodiment. The absence of the dispatch ID code or receipt of the termination field, and its coupling to controller 20 causes the controller 20 to redirect the data channel demultiplexer 8 or audio channel demultiplexer 10, in the case of data messages and audio messages respectively, to revert to the previously selected broadcast channel for resumption of the program originally selected by the user.

Figure 2:
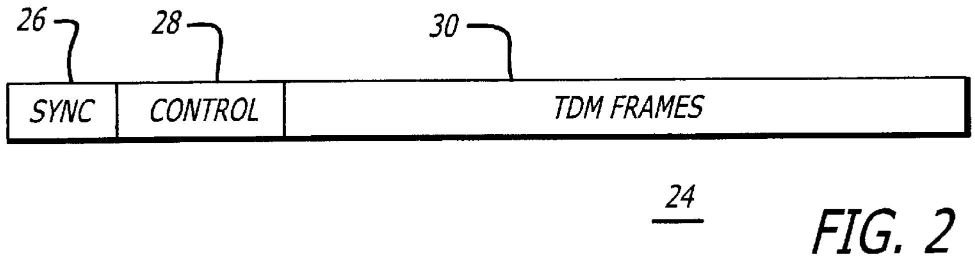
FIG. 2 is a diagram of the TDM data frame received by the receiver of the preferred embodiment.

Reference is directed to FIG. 2 which is a diagram of the TDM data frame output by radio receiver 6. The TDM data frame 24 comprises a synchronization field 26, as is typically used in TDM communications systems. A control field 28 follows which includes the broadcast information channel in an illustrative embodiment where there is only one broadcast information channel in the system. Alternatively, the broadcast information channel may be assigned to one of the regular TDM frame slots 30. In the preferred embodiment, there are 256 TDM frame slots in FIG. 30. Each typically has 8 kilobits of data per second, however, the control field 28 may direct other arrangements of TDM frame slots so that higher data and audio rates may be achieved. Each of the TDM frames slots in 30 comprises an error detection and/or error correction fields. Error correction may be achieved if desired by the system designers. Such uses of error detection and correction are well known to those skilled in the art.

Figure 3:
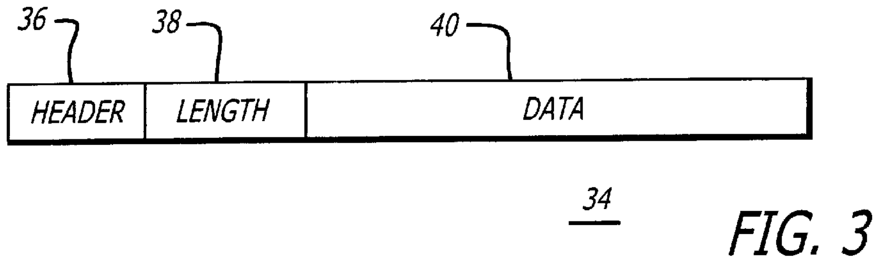
FIG. 3 is a diagram of the dispatch message.

Reference is directed to FIG. 3, which is a diagram of the dispatch broadcast message 34 in the preferred embodiment. A header field 36 may include the dispatch ID code to which the dispatch message 34 is directed, a command and associated dispatch ID code, or other information necessary to synchronize the receiver and demultiplexers. A length field 38 follows which indicates the length of the dispatch message. In addition, this field may be used as a reference for the controller to determine that the termination field has not been received to terminate the reception of the dispatch broadcast channel. The dispatch message data field 40 follows. This field may comprise digital data or audio data. At the end of this field is a termination field (not shown) which indicates the end of the dispatch message broadcast.

Figure 4:
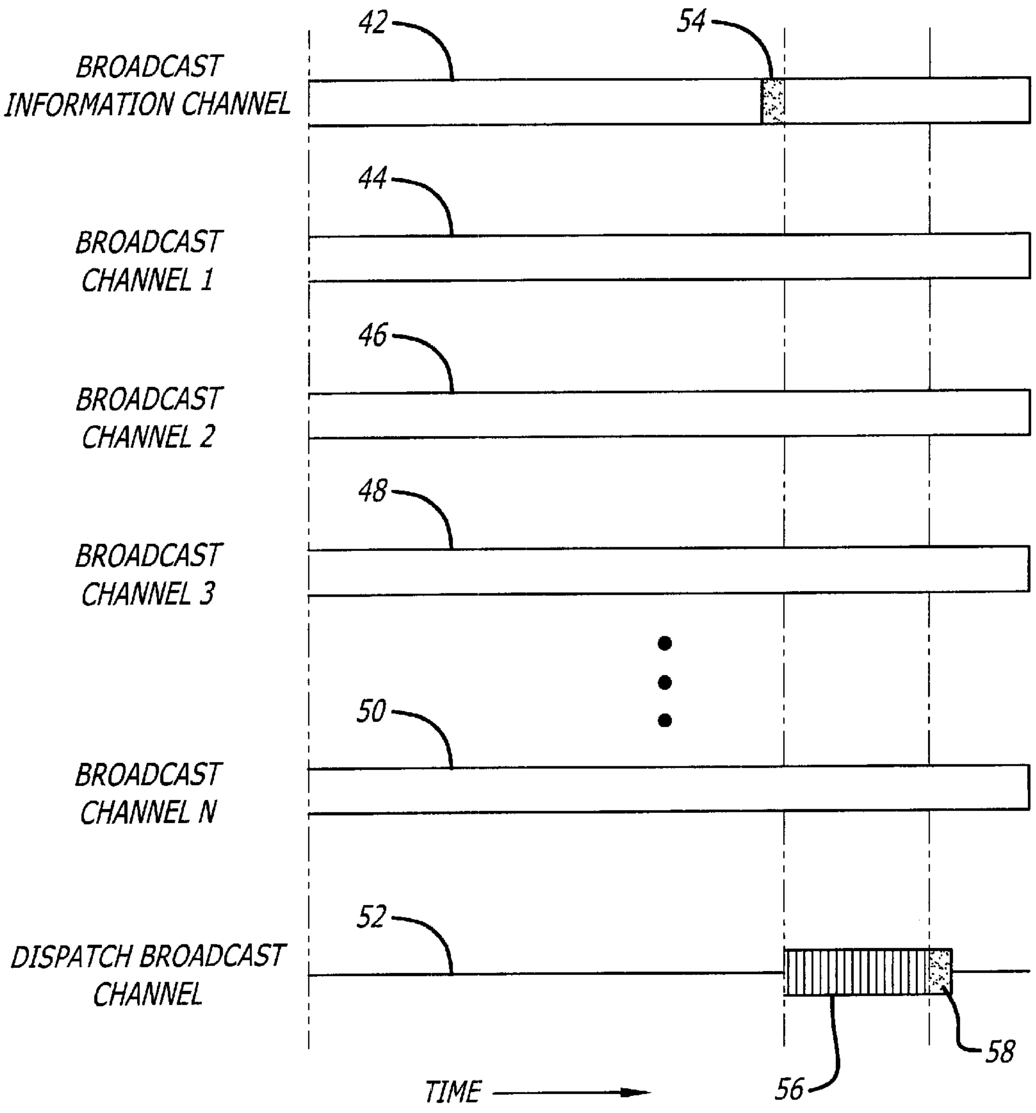
FIG. 4 is a diagram of the timing relationship between the broadcast information channel, broadcast channels, and the dispatch broadcast channel as dispatch messages are transmitted.

Reference is directed to FIG. 4, which is a diagram of the timing relationship between the broadcast information channel, broadcast channels and the dispatch broadcast channel as dispatch messages are transmitted within the system and received by the receiver. Since the system receives multiplexed broadcast signals, there exists a plurality of broadcast channel signals 44, 46, 48 and so on to 50, which may be selected by the user. In addition, there is at least one broadcast information channel signal 42. As the receiver monitors the broadcast information channel signals 42, it may receive a dispatch alert signal 54 that includes a dispatch ID code equaling one of the aforementioned previously stored dispatch ID codes. This causes the controller to direct the receiver to switch from receiving the selected broadcast channel to receiving the dispatch broadcast channel 52. At that time, the dispatch message 56 is received. The end of the dispatch message is followed by the termination field 58 which causes the receiver to revert to the previously selected broadcast channel.

Figure 5:
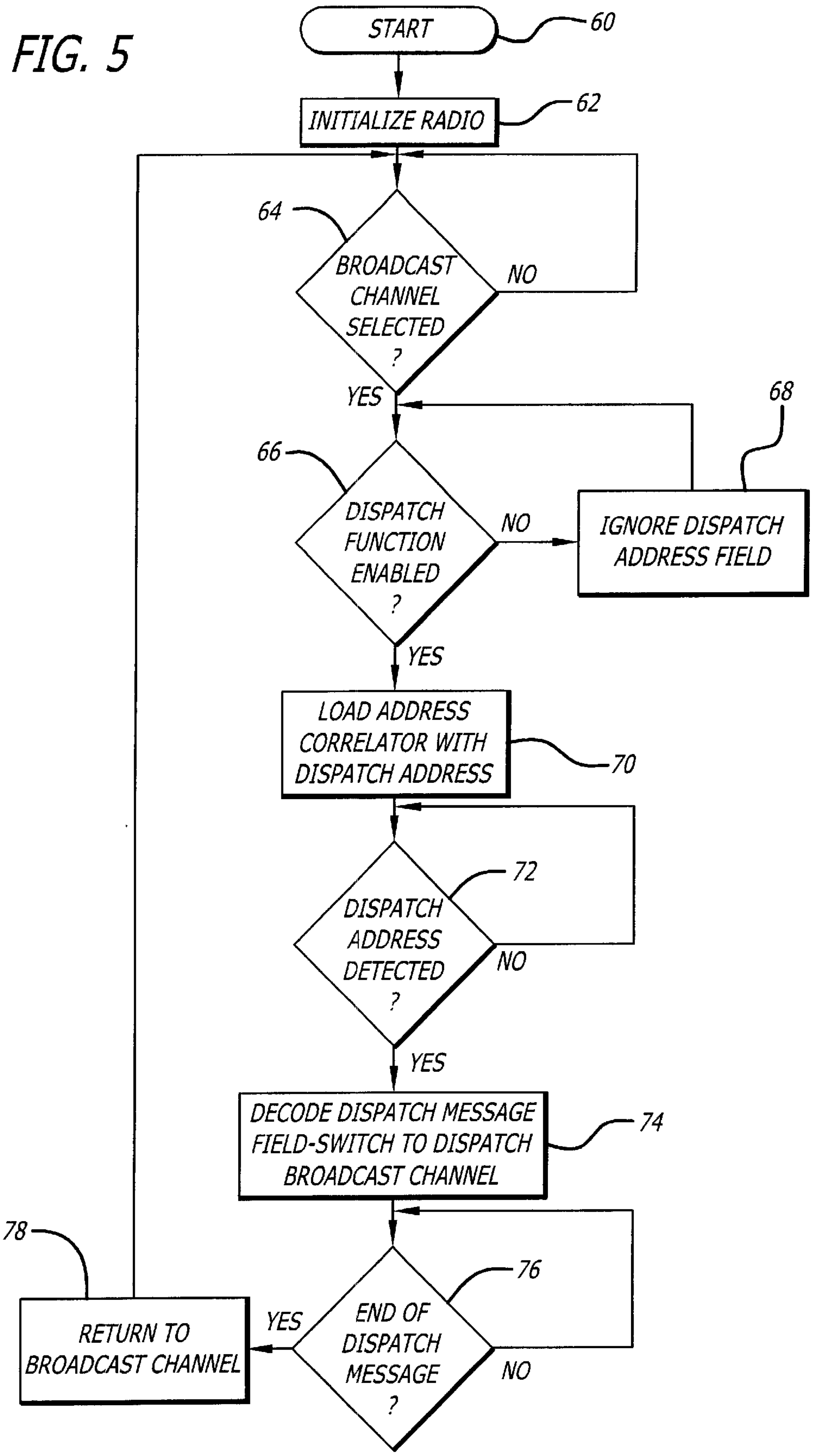
FIG. 5 is a flow chart of the preferred embodiment of the method of the present invention.

Reference is directed to FIG. 5, which is a flow diagram of the preferred embodiment. The process begins at start 60 and proceeds to initialization of the radio at step 62. Essentially this is the turning on of the radio and setting it for operation by the user through interaction with the user interface. At step 64, the user selects a broadcast channel for routine monitoring of the desired program content. Once a broadcast channel is selected at step 64, flow proceeds to step 66 where the receiver tests to determine if the dispatch function has been enabled. If it has not, the receiver ignores dispatch ID codes, or dispatch address fields, in the dispatch alert message fields, at step 68. On the other hand, at step 66, if the dispatch function has been enabled, the flow proceeds to step 70 where the address correlator is loaded with the previously stored dispatch ID codes.

If equality of the received dispatch ID code with any of the previously stored dispatch ID codes occurs at step 72, flow proceeds to step 74 where the dispatch alert message is decoded and the dispatch broadcast channel is identified, causing the receiver to switch to the designated dispatch broadcast channel to received the dispatch message addressed by the dispatch ID code. At step 76, the receiver tests to determine if the termination field has been received, thus indicating the end of the dispatch message. As mentioned earlier, the end of the dispatch message can be determined at step 76 by a number of means. Having determined that the dispatch message has ended at step 76 flow continues to step 78 where the receiver returns to the previously selected broadcast channel to continue receiving the selected program content.

Thus, the present invention has been described herein with reference to a particular embodiment for a particular application. Those having ordinary skill in the art and access to the present teachings will recognize additional modifications, applications and embodiments within the scope thereof. It is therefore intended by the appended claims to cover any and all such applications, modifications and embodiments within the scope of the present invention.

Accordingly,

What is claimed is:

1. A method of receiving with a receiver dispatch messages in a system which transmits dispatch alert messages on broadcast information channels, transmits dispatch messages on dispatch broadcast channels, and transmits program content on broadcast channels; comprising the steps of:

simultaneously monitoring a broadcast information channel to receive dispatch messages and receiving program content on a broadcast channel;

receiving a dispatch alert message on said broadcast information channel which identifies a dispatch broadcast channel and a dispatch message ID code;

comparing said dispatch message ID code to one or more previously stored dispatch ID codes in the receiver, and upon finding equality therebetween;

receiving a dispatch message identified by said dispatch ID code on said dispatch broadcast channel, and subsequently reverting to receiving said broadcast channel.

2. The method of claim 1 wherein said dispatch message comprises digital data and the receiver comprises a memory, further comprising the step of storing said dispatch message in the memory.

3. The method of claim 2 wherein the receiver includes a display and said method further comprises the step of displaying said dispatch message on the display.

4. The method of claim 1 wherein said dispatch message comprises audio data, the receiver comprises an output circuit coupled to an audio transducer and said method further comprises the steps of:

converting said dispatch message to an analog audio signal by the output circuit, and reproducing said analog audio signal by the transducer.

5. The method of claim 4; further comprising the step of storing the audio data in a memory for replay at a later time.

6. The method of claim 1 wherein said previously stored dispatch ID code is fixed within the receiver and is unique thereto.

7. The method of claim 1 wherein said previously stored dispatch ID code is fixed within the receiver and is shared by and common to all receivers operable within the system.

8. The method of claim 1 wherein the receiver comprises a memory and wherein said previously stored dispatch ID codes are programmable in the memory.

9. The method of claim 8 wherein the system broadcasts ID code assignment messages on the broadcast information channels, and the ID code assignment messages include assigned dispatch ID codes related to unique dispatch ID codes and said method further comprises the steps of:

receiving an ID code assignment message on said broadcast information channel, said ID code assignment message having an assigned dispatch ID code and a unique dispatch ID code therein;

comparing said unique dispatch ID code to said previously stored dispatch ID code and upon finding equality there between;

storing said assigned dispatch ID code in the memory, and comparing subsequently received dispatch ID codes with both of said previously stored dispatch ID code and said assigned dispatch ID code stored in the memory for a determination of equality.

10. The method of claim 1 wherein the dispatch messages comprise termination data and said reverting to receiving said broadcast channel step occurs upon detecting termination data in said dispatch message.

11. The method of claim 1 wherein the dispatch message comprises periodic repetitions of the dispatch ID code and said reverting to receiving said broadcast channel occurs upon failure of detection of the dispatch ID code within the dispatch method.

12. The method of claim 10 wherein said reverting to receiving said broadcast channel step occurs in the event of not detecting said termination data within a predetermined time of receiving said dispatch message.

13. The method of claim 1 wherein said reverting to receiving said broadcast channel step occurs in the event of receiving a second dispatch message on said dispatch channel having a dispatch ID code that is not equal to said previously stored dispatch ID code.

14. A radio receiver system adapted to receive dispatch messages through an antenna in a system which transmits dispatch alert messages on broadcast information channels, transmits dispatch messages on dispatch broadcast channels, and transmits program content on broadcast channels; said system comprising:

a receiver for outputting multiplexed data signals including broadcast information signals, broadcast signals, and dispatch broadcast signals;

a demultiplexer coupled to said output of said receiver for receiving said multiplexed data signals, said demultiplexer having a first output for outputting demultiplexed broadcast information signals and a second output for selectively outputting broadcast signals or dispatch signals in accordance with control commands;

an output circuit coupled to said second output of said demultiplexer for receiving said broadcast signals or said dispatch signals, said output circuit operable to convert said signals to analog audio signals;

an address correlator coupled to said first output of said demultiplexer for receiving said broadcast information signals therefrom and continuously compare the flow of data in said broadcast information signals to a previously stored dispatch ID code, said address correlator having a dispatch alert output which indicates the existence of equality between a received dispatch ID code in said broadcast information signals and said previously stored dispatch ID code, and a controller coupled to said demultiplexer and said dispatch alert output, said controller responsive to said indication of equality to output control commands to said demultiplexer, causing it to change states from demultiplexing said broadcast information signals to demultiplexing said dispatch signals.

15. A radio receiver adapted to receive dispatch messages through an antenna in a system which transmits dispatch alert messages on broadcast information channels, transmits dispatch messages on dispatch broadcast channels, and transmits program content on broadcast channels; comprising:

a receiver having an output which outputs multiplexed data signals including broadcast information signals, broadcast signals, and dispatch broadcast signals;

a demultiplexer coupled to said output of said receiver for receiving said multiplexed data signals, and having a first output for outputting demultiplexed broadcast information signals and a second output for selectively outputting broadcast signals or dispatch signals in accordance with control commands;

an memory coupled to said second output of said demultiplexer for receiving said broadcast signals or said dispatch signals;

an address correlator coupled to said first output of said demultiplexer for receiving said broadcast information signals therefrom and continuously compare the flow of data in said broadcast information signals to a previously stored dispatch ID code, said address correlator having a dispatch alert output which indicates the existence of equality between a received dispatch ID code in said broadcast information signals and said previously stored dispatch ID code, and a controller coupled to said demultiplexer and said dispatch alert output, said controller responsive to said indication of equality to output control commands to said demultiplexer, causing it to change states from demultiplexing said broadcast information signals to demultiplexing said dispatch signals.

* * * * *